Patented May 13, 1924.

1,494,063

UNITED STATES PATENT OFFICE.

EMILE DE STUBNER, OF NEW YORK, N. Y.

RESINOUS COMPOSITION.

No Drawing. Application filed May 13, 1918, Serial No. 234,118. Renewed October 3, 1923.

*To all whom it may concern:*

Be it known that I, EMILE DE STUBNER, a citizen of Switzerland, residing at New York, in the county of New York and State of New York, have invented certain new and useful Improvements in Resinous Composition, of which the following is a specification, reference being had therein to the accompanying drawing.

The object of this invention is to produce a new composition of matter which may be employed for a variety of purposes such as are now served by rubber, gutta percha, and the like, and in addition will possess valuable characteristics which will adapt the same for other and further uses; and which composition of matter may be produced at very small expense, and with this end in view my invention consists in the novel and improved composition of matter, and the process of making the same, which composition and process will be fully described in the specification to follow, and the novel characteristics of which will be set forth in the appended claims.

I have found by tests and experiments that resinous and gummy substances can be dissolved in unsaturated fatty acids or in mixtures of the same with saturated acids, or their esters or mixtures thereof, and particularly I have demonstrated practically that shellac can be readily dissolved in a warm bath or quantity of the unsaturated fatty acid split off from China-wood oil, or esters or mixtures thereof, the said solution forming a composition of matter resembling rubber in many of its characteristics, and possessing in addition, valuable properties not possessed by rubber.

My improved composition may be produced in different degrees of consistency from hard to soft, according to the proportions of the ingredients employed in its make-up, and in producing said composition in accordance with my process I provide a quantity of an unsaturated fatty acid or its esters or mixtures thereof, as the case may be, which is heated to a suitable temperature, and I place therein a quantity of gum or resin, as the case may be, and I thoroughly intermix the two so that the gum or resin will dissolve, the quantities of the ingredients employed being proportioned according to the consistence which it is desired that the product will possess, and the particular use for which it is to be employed.

In the production of a product for instance whose ingredients are shellac and the unsaturated fatty acid split off from China-wood oil, I mix the two in proportions of $33\frac{1}{3}\%$ or thereabout of the acid, and $66\frac{2}{3}\%$ or thereabout of shellac, first heating the acid to a temperature of from 100° to 300° Fahr. The acid is placed in a suitable vessel and heated to the degree stated, and the proper proportion of shellac is added thereto, and the two substances thoroughly stirred or agitated until the shellac is wholly dissolved in the acid. The mixture on cooling will take the form of a substantial, solid body, and it may be poured before cooling into suitable molds or otherwise handled to give it the desired shape and form.

I have found the composition of matter thus formed to possess among other characteristics, very high insulating properties; to be waterproof and oilproof; to possess a considerable degree of elasticity; and to possess other properties which make the same adaptable with valuable advantages for many purposes in the commercial arts. For instance the product may be employed as an insulating material, and as a matter of fact it possesses higher dielectric properties than rubber insulation. It is thus well adapted and suitable for covering cables and the like, and also as an insulating support or base for transformers which are now customarily seated in a body of oil and for which use rubber is not suitable. Also my improved product may be employed for the manufacture of the inking rolls of printing machinery, and for platens for typewriting machines; and by heating the composition to a proper temperature to give it a fluid form, fabrics may be impregnated with the same to render them waterproof. So also the product may be employed by reason of its valuable and peculiar characteristics, for various other purposes unnecessary here to enumerate.

While in the example herein given, the ingredients of my improved composition of matter are set forth as consisting of shellac and the unsaturated fatty acid of China-wood oil, the invention is not limited to these particular ingredients, as it is applicable as well to other gums and resins and to other varieties of unsaturated fatty acids, or mixtures thereof with saturated acids. For instance the fatty acids split off from linseed oil may be used as the solvent, and also the fatty acid split off from perilla. Instead of shellac, I may employ acaroides and also gum benzoin and similar gums; and various resins may be employed in making up my improved composition of matter.

While in the foregoing description I have set forth my invention, both as to the composition of matter and the process of producing the same, in the form and manner which I prefer to adopt, it will be understood that the invention is not limited to the particular ingredients set forth in the example given, nor to the particular process in bringing about the admixture of said ingredients, except in so far as such limitations are specified in the claims.

Having thus described my invention, what I claim is:

1. The improved composition of matter consisting of shellac dissolved in an unsaturated fatty acid.

2. The improved composition of matter consisting of shellac dissolved in an unsaturated fatty acid split off from China-wood oil.

3. The improved composition of matter consisting of $66\frac{2}{3}\%$ of shellac dissolved in $33\frac{1}{3}\%$ of an unsaturated fatty acid split off from China-wood oil.

In testimony whereof, I have affixed my signature hereto.

EMILE DE STUBNER.